: US 12,058,389 B2
(45) Date of Patent: Aug. 6, 2024

(54) TRANSCODING OF VIDEO CONTENT

(71) Applicant: Amazon Technologies, Inc., Reno, NV (US)

(72) Inventors: Varun Ram, Portland, OR (US); William Dirks, Portland, OR (US); Meera Jindal, Portland, OR (US); Sierra Anderson, Portland, OR (US); John Cowgill, Seattle, WA (US); Kenneth Victor Chamberlin, Portland, OR (US); Mark DeSpain, Hillsboro, OR (US); Matthew Brinkley, Portland, OR (US); Khawaja Salman Shams, Portland, OR (US); Alex Xiaoye Zhang, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 17/576,489

(22) Filed: Jan. 14, 2022

(65) Prior Publication Data

US 2022/0141507 A1 May 5, 2022

Related U.S. Application Data

(63) Continuation of application No. 15/957,101, filed on Apr. 19, 2018, now Pat. No. 11,228,792.

(Continued)

(51) Int. Cl.
H04N 21/234 (2011.01)
H04L 65/612 (2022.01)
(Continued)

(52) U.S. Cl.
CPC ..... H04N 21/23424 (2013.01); H04L 65/762 (2022.05); H04N 19/40 (2014.11); H04N 21/812 (2013.01); H04L 65/612 (2022.05)

(58) Field of Classification Search
CPC ............ H04N 21/23424; H04N 19/40; H04N 21/812; H04N 19/46; H04L 65/762; H04L 65/612; H04L 65/70; H04L 65/80
See application file for complete search history.

(56) References Cited

U.S. PATENT DOCUMENTS 9,794,604 B2 * 10/2017 Ohno ................. H04N 21/8456
2004/0194131 A1 * 9/2004 Ellis ....................... H04N 21/47
  725/35
2013/0091521 A1 * 4/2013 Phillips ............ H04N 21/23424
  725/35

(Continued)

FOREIGN PATENT DOCUMENTS

WO    WO-2015105436 A1 *  7/2015    ....... H04N 21/23418

OTHER PUBLICATIONS

Non-Final Rejection issued in U.S. Appl. No. 15/957,101, dated Oct. 25, 2019.
Final Rejection issued in U.S. Appl. No. 15/957,101, dated May 7, 2020.

(Continued)

Primary Examiner — Nathan J Flynn
Assistant Examiner — Christine A Kurien
(74) Attorney, Agent, or Firm — Hogan Lovells US LLP

(57) ABSTRACT

Dynamic transcoding can be used to provide supplemental content, selected to be played during breaks in a stream of primary content, that has the same format as the primary content. It can be desirable to provide supplemental content that is personalized. This may include additional content or advertising that may be of interest or relevance to a viewer. In many instances, the supplemental content will come from a different source and thus can be in a different format. Approaches in accordance with various embodiments can take advantage of dynamic transcoding of the supplemental content to provide properly formatted supplemental content (Continued)

through the same stream as the primary content. A custom manifest can be provided to the media player that points to the transcoded supplemental content. At an appropriate break in the playback, the media player can use the manifest to obtain the formatted supplemental content.

20 Claims, 7 Drawing Sheets

Related U.S. Application Data

(60) Provisional application No. 62/590,085, filed on Nov. 22, 2017.

(51) Int. Cl.
*H04L 65/75* (2022.01)
*H04N 19/40* (2014.01)
*H04N 21/81* (2011.01)

(56) References Cited

U.S. PATENT DOCUMENTS

| | | | |
|---|---|---|---|
| 2015/0201227 A1* | 7/2015 | Krasko | H04N 21/25883 725/34 |
| 2015/0319505 A1* | 11/2015 | Patadia | H04N 21/858 725/34 |
| 2016/0191356 A1* | 6/2016 | Sundaresan | H04L 65/612 709/224 |
| 2016/0316233 A1* | 10/2016 | Ghadi | H04N 21/4302 |

OTHER PUBLICATIONS

Non-Final Rejection issued in U.S. Appl. No. 15/957,101, dated Oct. 1, 2020.
Final Rejection issued in U.S. Appl. No. 15/957,101, dated Apr. 2, 2021.
Notice of Allowance issued in U.S. Appl. No. 15/957,101, dated Sep. 15, 2021.

* cited by examiner

TRANSCODING OF VIDEO CONTENT

CROSS-REFERENCE TO RELATED APPLICATIONS

This application is a continuation of U.S. patent application Ser. No. 15/957,101, filed Apr. 19, 2018, issued as U.S. Pat. No. 11,228,792, which claims priority to U.S. Provisional Patent Application Ser. No. 62/590,085, filed Nov. 22, 2017, both entitled "Transcoding of Video Content," the contents of both of which are hereby incorporated by reference herein in their entirety for all intents and purposes.

BACKGROUND

In recent years, there has been a surge of development and releases of new types of mobile devices made available to the public. Today's consumer is often equipped with a smart phone, tablet, media player, or other device that can be used to access the Internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. As such, these companies are looking for encoding systems and services that can provide the best video and audio quality to consumers at a low cost. Because digital video (and audio) content is often delivered to multiple device types over unmanaged networks with fluctuating bandwidth, it is desirable to utilize transcoding to produce a version of each asset to accommodate these variants. The transcoding is complicated by the fact that the video content may be sourced from multiple providers and may have significantly different formats. Two instances of content to be provided from the same player may have different aspect ratios, bitrates, or other aspects. This difference can provide an unpleasant viewing experience for various viewers, and can be undesirable to the providers of that content.

BRIEF DESCRIPTION OF THE DRAWINGS

Various embodiments in accordance with the present disclosure will be described with reference to the drawings, in which.

DETAILED DESCRIPTION

Figure 1:
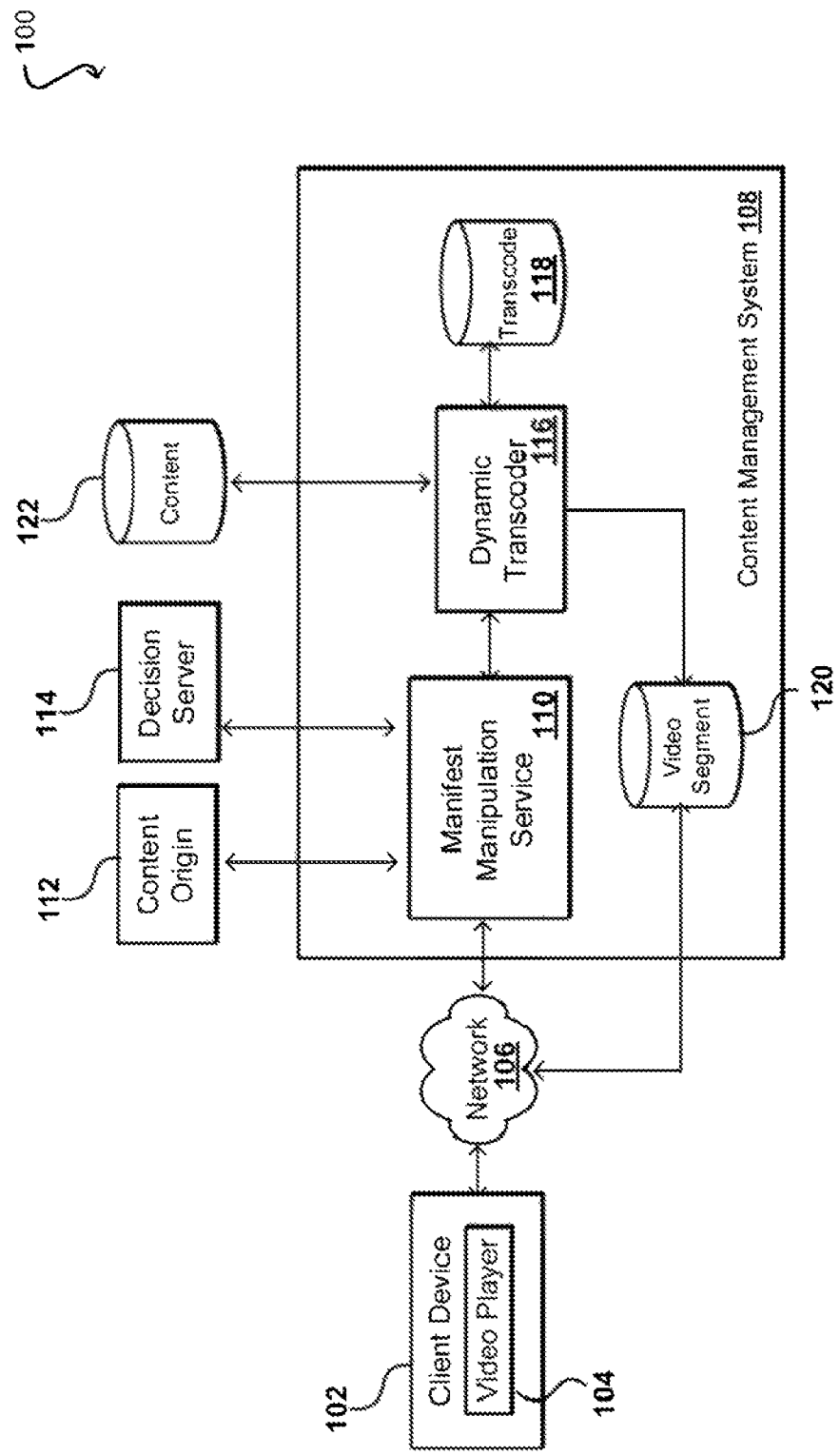
FIG. 1 illustrates an example system that can be used for just-in-time media transcoding in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches to processing content. In particular, various embodiments provide approaches for transcoding or otherwise processing content, such as media content, that may be provided or otherwise obtained in different formats. In many instances it can be desirable to provide supplemental content that is personalized for a viewer. This may include, for example, additional content or advertising that may be of particular interest, or of at least some relevance, to the viewer. In many instances, however, the supplemental content will come from a different source than the primary content being presented by the media player, and thus can be in a different format. In order to provide a consistent viewing experience, among other such advantages, approaches in accordance with various embodiments can take advantage of dynamic transcoding of supplemental content to provide properly formatted supplemental content through the same stream as the primary content. A custom manifest can be provided to the media player that points to the transcoded supplemental content. At an appropriate break point or marker in the playback, the media player can use the information in the manifest to obtain the formatted supplemental content. The media player thus obtains the supplemental content on the same stream as the primary content, as opposed to having to separately obtain the supplemental content from another source as in conventional approaches.

Various other functions can be implemented within the various embodiments as well as discussed and suggested elsewhere herein.

Content providers can make various types of content available through mechanisms such as streaming. When streaming, a media player on a device will typically request content to be displayed or presented via that media player. The media player can begin to buffer the content as it is received, and initiate playback once a sufficient amount of content has been received. The playback can occur during the transfer of media content, or while the requested media content is "streaming" to the device. Using this approach, the client device typically will only store a limited subset of the media data at any time, such as the content currently being displayed and the content in the circular buffer, with any displayed content being deleted from the device to conserve resources.

In many instances the content sent over a video stream will include different portions obtained from different sources that may have different formats. This can include, for example, primary content from a first provider and secondary or supplemental content, such as advertising or related video, from a second provider. When supplemental content such as advertising is inserted into a video stream, the advertising content is often rendered with different attributes than those of the surrounding video, where those attributes may relate to a different aspect ratio, a different bitrate, or a different number of frames per second, among other such options. This difference in formatting can be jolting or distracting to a viewer, destroying the immersive video experience. Further, the provider of the supplemental content may be displeased to discover that the quality of the advertising displayed was significantly lower than that of the primary content with which it was displayed, which could convey a similar lower quality for the product or service being advertised.

Accordingly, approaches in accordance with various embodiments can utilize a dynamic transcoder, also referred to herein as a "Just in Time Transcoder" or JITT. Such a transcoder can be configured to transcode video on demand, or in response to a request for the content, so that the format of the inserted video matches that of original content being served to a video player or other such destination. For example, in a content delivery service, such as may provide for supplemental content insertion, an underlying video stream such as a football game can be provided for playback on a target video player. When a specified break occurs or is encountered in the primary video content, the supplemental content (e.g., advertising) to be played can be transcoded into a number of formats that match those of the video players playing the football game. If there are customers watching on mobile devices, on smart televisions, or in a browser, for example, the transcoding can be performed for each of these formats using JITT. The appropriate format can then be provided for each video stream. Since transcoding is performed on demand, the service can support personalized content that can be different for each viewer. Thus, personalized supplemental content can be selected and provided for each stream in a format that is the same as, or substantially similar to, that of the primary content on the stream. Further advantages can be obtained by such an approach, such as where the inclusion of supplemental content in the video stream itself, instead of accessible from a third party (or at least different) source, can prevent the supplemental content from being blocked or filtered by various third party apps or other such mechanisms. Markers can also be excluded from the personalized content, which can make it even more difficult for the supplemental content to be automatically removed or skipped in the stream.

Such an approach is not limited to specific types of supplemental content, such as advertising, and can be used with different instances of primary content on a stream as well. Various approaches can be used advantageously any time one wants to splice together video content from different sources, in real time, and preserve the video quality. For example, cutting breaking news or an amber alert with primary content could utilize such an approach. The news content may not be known beforehand so when one cuts to the news content from the primary content, the news content will need to be transcoded on demand in many instances.

Transcoding generally relates to the decoding and re-encoding of digital content from one format to another. Transcoding is often necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported. Further, in many instances, the presentation of textual information can be an important part of the digital content and can add to the complexity of transcoding the digital content. The content, once transcoded, can be delivered using a system such as a content delivery network. A content delivery network (CDN) is an interconnected network of computer nodes that contain copies of various types of data. Using a CDN can improve access to the data cached at the nodes by increasing access bandwidth/redundancy and reducing access latency. CDNs are often used to provide access to media content.

FIG. 1 illustrates components of an example system 100 that can be used for media transcoding in accordance with various embodiments. The figure illustrates a content management system, although it should be understood that various functionality could be offered as a service to various parties or entities as well. In this example, a video player 104 is illustrated that is installed on a client device 102, such as a computing device of an end user. The video player can also execute in another application in some embodiments, such as a web-based video player that operates within a client browser application, among other such options. The video player can also be a standalone physical player or other such device that is configured to present various types of media content. In this example, the video player 104 makes a call across at least one network 106, such as the Internet or a cellular network, to a content management system 108. The request can be submitted directly to the content management system through a content link, or directed to the content management service from another system or entity, among other such options. The request can relate to a specified instance of primary content, but the request itself can be directed to obtaining a video manifest, or other content manifest or file, for the requested content.

The request can be received to an interface layer (not shown in this figure) or other such location or address of the content management system, and can be directed to a sub-system such as a manifest manipulation service (MMS) 110. The manifest manipulation service 110 in this example can be responsible for obtaining and assembling the appropriate material into a video manifest that can be provided to the video player 104 for purposes of obtaining the relevant content to be provided on the respective video stream. In order to obtain the necessary information, the manifest manipulation service 110 can make a call to a content origin 112, which may be offered by the same entity as the content management system or a third party, among other such options. In response to the call, the manifest manipulation service 110 can receive a template video manifest. A template manifest can include basic information for the primary video content on a stream, such as the timing and location in which to display supplemental content, such as advertising in response to one or more ad markers in the template manifest. The manifest manipulation service 110 can also use the template manifest to determine the formats in which the primary video content is available. If a content marker is discovered in the template manifest received from the content origin 112, the manifest manipulation service 110 can send another request to a content decision server 114 configured to decide on, select, or suggest one or more instances of supplemental content to be provided for presentation corresponding to the marker.

The decision server 114 can receive information that can be used to select supplemental content, such as advertising. In various embodiments the information will include information received from the video player 104 in the initial request. This may include, for example, demographic information or other information that can be used to personalize the content selected for presentation via the video player. Other sources of information can be consulted as well, such as an account manager for the content management system 108 that stores information about various viewers of various video players or devices, among other such options. As an example, information about an age, gender, and/or location of the viewer might be used by the decision server 114 to determine relevant advertising to provide with the primary content, where the criteria used for selection may be provided by an advertiser or other such entity, as known for advertising content. The decision server 114 can then return identifying information for one or more instances of content to be provided for display with the primary content.

Upon receiving identifying information for the supplemental content, the manifest manipulation service 110 can contact a dynamic transcoder 116, also referred to herein as a Just in Time Transcoder (JTTT), for the transcoded versions of the supplemental content that were determined according to the template manifest. In this example, the dynamic transcoder 116 can search against a transcode data repository 118 to determine whether the identified supplemental content has already been transcoded into the relevant format(s). In some embodiments the information may instead be stored to a registry internal to the manifest manipulation server or dynamic transcoder, among other such options. If the format is already available, the content can be pulled from the video segment repository 120 as needed in response to the relevant markers on the streams. If those transcoded versions do not exist according to the transcode repository 118, the dynamic transcoder 116 can obtain the identified supplemental content and transcode the content into the necessary formats. In some embodiments a caching layer (not shown) can be positioned between the dynamic transcoder 116 and the transcode repository 118 to improve performance. If the transcoding is to be performed, the transcoded content video segments can be written to a video segment data store 120 after transcoding into the appropriate format(s). The location of the video segments can also be stored in the transcode repository 118 for reference for future requests for that content. Once the transcoded video segments are available, the locations of the transcoded content segments are returned to the manifest manipulation service 110. The manifest manipulation service 110 can then insert the segment locations into the template manifest, which was returned from the content origin, to generate a personalized manifest for the video player. The personalized manifest can then be returned to the video player 104 in response to the request for the primary content.

At various points in the presentation of the primary content, the video player will attempt to obtain the identified supplemental content segments for presentation. This can involve the player submitting a call or request to the video segment data store 120 using the location information or identifiers contained in the personalized manifest. In some embodiments a CDN can sit in front of the video segment data store 120 to provide a caching layer between the data store 120 and the video player 104. In some situations the transcode of the supplemental content may take longer than the time limit required for the content management system 108 to return the manifest to the video player 104. In these cases, the content management system may not insert the transcoded content into the manifest, and may instead insert alternative content or rely on an underlying portion of the primary content, among other such options. The content management system may complete the transcode anyway, and store the transcoded content in the video segment data store 120 for future usage. In some embodiments, initial requests for specific content may not result in that transcoded content being inserted, but can result in that transcoding being performed so the content is available in the correct format for future requests.

Transcoding systems and services in accordance with various embodiments can convert to, and between, a variety of different formats. This can include conversion from one steaming media format to another for encoding media content in real-time from a network edge (e.g. content delivery network point-of-presence) or other such location. A copy of media content (e.g. an audio, video, or multimedia file) can be stored at a location such as a server located at the network edge (e.g. a content delivery network (CDN) point-of-presence (POP)). The service can receive a request from a client device (e.g. mobile phone, tablet computer) to access the media content, and a component such as an edge server located at the POP can convert the request input media content into the requested output at that time.

In various conventional approaches, supplemental content such as advertising is transcoded into a determined set of formats that are most popular or likely to be requested. A media player will play a video stream and encounter an ad marker or other content identifier. The media player or client device will then submit a request to a decision server that will select supplemental content based (at least in part) on information provided with the request, and can return an address or identifier, such as a hyperlink, that can be used to obtain the supplemental content, such as an advertising video file. The media player can then submit a request to obtain the video file. In conventional systems, the video file will be returned in the format to which it was previously transcoded, or one of those formats. This can result in a mismatch with respect to the player and the primary content, which can result in issues such as the presence of black bars due to aspect ratio differences, lower resolution video playback, and the like. After the supplemental content has completed playback the primary content can resume, with a similar change in video aspects or format.

Approaches in accordance with various embodiments can instead transcode the supplemental content to the format requested by the video player that will be consistent with that of the primary content. The requests for supplemental content can be made on the server side, instead of from the client device. By having a server-side component, such as the manifest manipulation service 110, communicate with the content decision server 114, the manifest manipulation service 110 can determine the available formats for the identified supplemental content. The manifest manipulation service 110 can also know or determine the formats for the stream being presented through the media player. The manifest manipulation service 110 can then identify the supplemental content in the correct format, or contact a dynamic transcoder 116 to transcode the content into the correct format. As discussed elsewhere herein, a single high-quality copy of the supplemental content may be provided by the content provider, and this original high quality copy can be used to generate the various transcodes needed. If the transcode completes in time, the transcoded content can be provided to, or obtained by, the media player for playback on the relevant stream. The supplemental content is thus dynamically provided in the format that matches that of the underlying video stream. The manifest manipulation service can return the personalized manifest with the most recent information, as may take the form of identifiers or hyperlinks in a text file associated with the current or requested video stream. In many instances the manifest will include content markers and links to the video segments to obtain and play for each of those markers. A manifest in many embodiments will be a list of video segment files and timing/order information for playback, as may be provided via a set of discontinuity markers. The list of files can include multiple instances of primary content as well, as may be played in a specified sequence identified in the manifest.

In various embodiments the video player 104 will submit a request for a stream, such as a video stream for a live event where the stream is transmitted in near real time. For live events, video segments will be added to the end of the manifest and updated over time. There may be a rolling five minute window, for example, where the manifest indicates upcoming breaks that will occur over the next five minutes. The request from the player can then be the same type of request sent repeatedly, such as every two seconds. The request from the media player can ask for the current manifest file, which can be provided by the manifest manipulation service 110 or other such component. The same manifest may be returned if there are no changes, or a response may be returned indicating that the last sent manifest is still current. If there are updated or appended video segments identified in the manifest then an updated manifest can be sent as appropriate. In some embodiments a new manifest can instead be pushed to the relevant media player(s) for each update of the relevant manifest. As opposed to conventional approaches, manifests in accordance with the various embodiments will have the supplemental content integrated into the unified stream to be presented by the media player, instead of the player having to obtain the supplemental content from another source or separately according to a separate request. Such an approach can provide for near seamless playback, with content of a consistent format being provided via a single media stream.

As mentioned, the decision server 114 or another such offering can provide personalized or otherwise specifically selected content to be provided with primary content for a video player or other specified entity. For ad servers, this can include determining demographic and other information for a user of the player and selecting one or more relevant ads to provide for display. In some embodiments the ad server can provide a set of potential ads to be displayed, such as through entries in an XML, document, and then one or more of those can be selected based on factors such as format, time, availability, and the like. In some instances one of the ads may not yet be transcoded into the correct format (e.g., HLS or Dash), so an alternative choice can be presented for display on the stream. The selection of that ad content, however, can cause that content to be transcoded into that format for serving future requests. As mentioned, one or more addresses or hyperlinks can be provided that identify locations, such as a third party content repository 122, from which the content in the appropriate format can be obtained. In some embodiments an ad provider might provide the ad content in a limited set of formats as discussed previously. In some instances the formats may be sufficiently similar to those of the requested stream that the existing instance can be provided. In at least some embodiments there are criteria used to determine whether to transcode a new instance. If, for example, the resolution and aspect ratio are the same but the bitrate is slightly different, that may not be enough to warrant a new transcode in some embodiments. Similarly, the resolution or color depth might need to vary by at least a minimum amount before a new transcode is provided. In some embodiments there may be limits on the amounts by which these instances can vary, and there can also be minimum or maximum values applied, beyond which the selections cannot vary. For example, there might be maximum bitrate settings to keep costs down, or minimum resolution settings to prevent undesirable quality for advertising corresponding to specific entities, etc. When the video player encounters an identifier or break in the manifest, the video player 104 can contact the video segment data store 120 to obtain the video files in the appropriate format. Although not shown in this figure, a content delivery network (CDN) may sit between the video segment data store 120 and the video player, as discussed elsewhere herein.

As mentioned, there can be various types of content combined on a video stream. For any period of time, there may be primary content which is the content that was requested by the media player over a period of time. In the same video stream there may also be supplemental content, cut into breaks in the primary content, or a sequence of alternate primary content, among other such options. The supplemental content as discussed can include any content determined to be relevant or appropriate for the video stream, as may be selected for the player, viewer, primary content, or other such information. This can include, for example, descriptive content, advertising content, breaking news content, amber alert content, or other content selected for display during a break in (or outside) the playback of the primary content. In some embodiments the supplemental content can be determined based at least in part upon information contained in, or identified from, the primary content.

Figure 2:
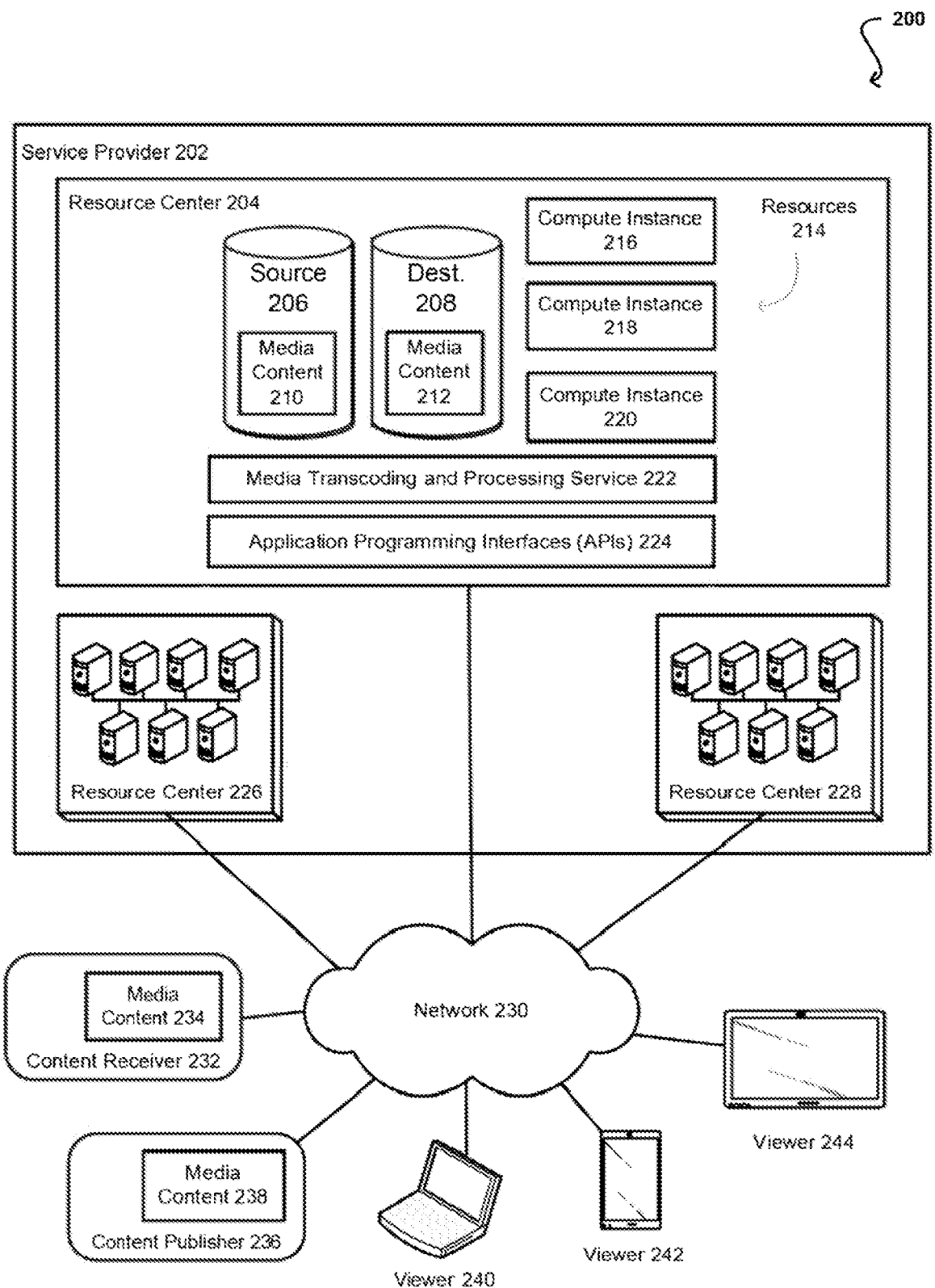
FIG. 2 is a general illustration of an environment in which the transcoding service can be utilized, in accordance with various embodiments.

FIG. 2 is an example of an environment 200 in which the transcoding and other processing of media content can be implemented, in accordance with various embodiments. As illustrated, a service provider environment 202 can include a variety of devices and components for receiving and processing requests from various users across one or more networks 230. As discussed, access to these resources can be provided as one or more services, such as Web services. In this example, the service provider environment includes a plurality of resources 214, such as data storage resources and request processing resources, that can be deployed in one or more resource centers 204, 226, 228 in one or more locations and made accessible over the one or more networks 230. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, a content delivery network (CDN) point-of-presence (POP), and the like.

In accordance with various embodiments, resource centers of the service provider 202 may include various computer servers, data storage machines, network devices and other hardware resources necessary to provide the network-accessible services on behalf of the clients of the service provider. For example, as shown in FIG. 2, the resource centers can include physical servers and other devices located in a particular geographical location, which enable the service provider to transcode, process and/or deliver media content to viewer or client devices 240, 242, 244. It should be noted that when media content is delivered to a "viewer" or an entity viewing the media or other such content, the content is delivered to a client or other such device of the viewer. As used herein, viewer and client device may be used interchangeably. In accordance with an embodiment, a resource center can include media cache servers, transcoding servers, watermarking servers, and the like. The view of one of the resource centers 204 is shown in an exploded view to provide further illustration of the types of resources 214 that can be contained in a resource center in accordance with various embodiments. It should be noted that the resources 214 can reside in one resource center or can alternatively be distributed across multiple resource centers.

In accordance with various embodiments, the service provider 202 offers a media transcoding and processing service 222 in addition to many other services discussed herein. In one embodiment, the media transcoding and processing service 222 can perform the transcoding jobs of media content 210, 212 stored in data stores (e.g. source store 206 or destination store 208) of the service provider 202. In alternative embodiments, the media transcoding and processing service 222 may perform various other functions, such as transmuxing the media, adding security information (e.g. watermarks) to the media, translating the media, or adding subtitles or captions, among other such options.

In accordance with an embodiment, components of the service provider environment 202 enable a content publisher 236 to provide (e.g. upload) a media file to a source store 206 to have appropriate transcoding jobs performed thereon. In various embodiments, the source store 206 may be located on the resource center of the service provider or on a remote system, such as the system of the content publisher 236. As an example, the content publisher 238 can upload content 238, such as a media file, to a source store 206 and specify that a set of selected workflows should be applied to the media file. A workflow can apply one or more profiles to the media content. In accordance with an embodiment, a profile can contain the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 222 then carries out the workflow, including potentially transcoding the media content stored on a source store 206 into the appropriate encodings. Once workflow is complete, the resulting media content 212 can be placed into a destination store 208. The destination store may be located on the resource center of the service provider or a remote system, such as the system of the content publisher 236 or other entity, such as the content receiver 232. As such, in this example the media content located in the destination source has had the workflow applied. From the destination store 208, the media content 212 can be made available to a content receiver 232 or the various viewer or client devices 240, 242, 244 for download or other transmission. In alternative embodiments, the processed content could be made available to any other entities, including the content publisher 236 or third party service providers.

It should be noted that the term "transcoding" is often associated with a template, manifest, profile, or a workflow in this disclosure; however the various features of this disclosure are not limited to changing the encoding format of media and, in some embodiments, may not include changing the encoding format at all. For example, a profile, manifest, or workflow may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances 216, 218, 220 of the service provider 202. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines maintained by the service provider 202 and leased to its customers (e.g. a content publisher 236).

It should be noted that while FIG. 2 illustrates a source store 206 and a destination store 208 located in a resource center 204, the locations of such stores are not limited to any particular resource center, server, or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, one resource center 204 could be in Europe, one resource center 226 could be Asia, and one resource center 228 could be in the United States. In various embodiments, the various storage containers, servers, compute instances, transcoding services, and other resources described herein could also reside on a single device.

In accordance with various embodiments, the transcoding service 222 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others such as client devices, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 202 to gain access to media transcoding and processing service. Once an account is created, media assets (e.g. video files) to be transcoded are placed into an input store on the service provider. A workflow can be defined using an application programming interface (API) 224 or console, for example, to initiate a transcoding job which will be carried out using one or more of the compute instances 216, 218, 220. The resulting transcoded object(s) are placed into a defined output store 208 or some other specified location, such as a location on the system of the content publisher 236 or the content receiver 232. Alternatively, the transcoding service can cache the media assets at the network edge and perform the transcoding dynamically on a per-request basis depending on the type of requesting device.

In various embodiments, the media transcoding and processing service 222 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 224 or via the graphical console. These profiles can be used as is or modified into a custom profile to be reusable for subsequent transcoding job requests.

The content publisher 236 may be any content creator, content distributor, user generated content publisher, or any other entity that possess media content and desires to make that content available to viewers on their client device or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 232 can be any entity that is provided with content 234 that has been transcoded or otherwise processed by the transcoding service. For example, the content receiver 232 may be a third party movie distributor that wishes to provide the transcoded video content on its own website.

In accordance with an embodiment, the service provider 202 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 202 may implement a number of pricing models for using the transcoding service. As one option, the pricing of transcoding service could be based on the usage of compute instances 216, 218, 220 that are utilized by the content publisher 236. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs. As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there are a significant number of spot instances available. Taking advantage of low bid opportunities for instances can provide a customer (e.g. content publisher) with pricing advantages they have not been offered without building out transcoding services on their own. As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB. As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content, whether primary or supplemental, in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

Figure 3:
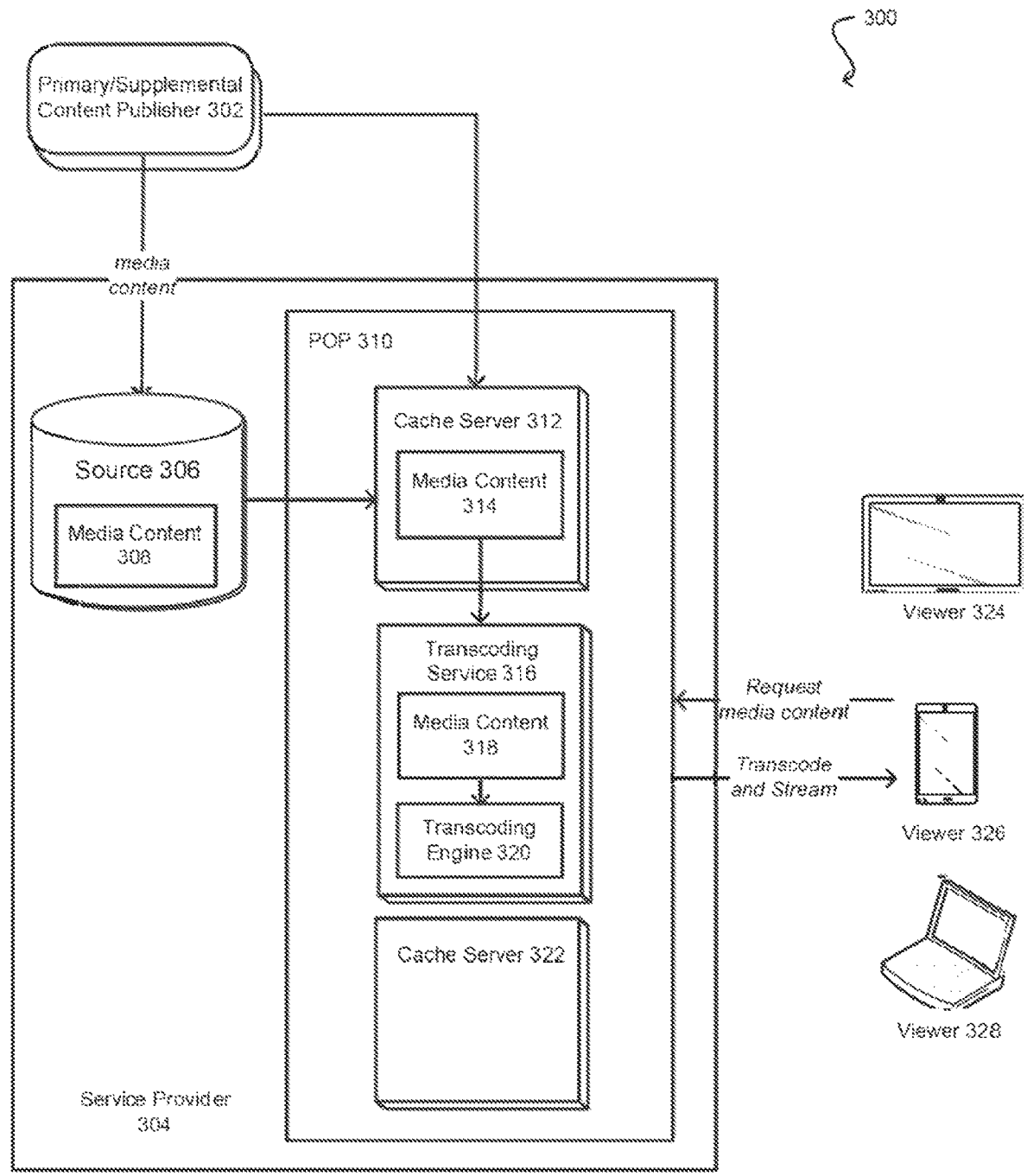
FIG. 3 is an example of an environment where primary and supplemental media content can be dynamically transcoded, in accordance with various embodiments.

FIG. 3 is an example of a network environment 300 where media content can be dynamically transcoded. Such an environment can be used to implement a variety of adaptive streaming solutions. Such solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When WISP is utilized, the media server records the state of each client device and determines the media to stream based upon the instructions received from the client devices and the client's state. However, the subtitles are pre-rendered at different lengths, even if the media is never consumed. These both limits the number of different segment lengths one could have, as well as places unnecessary processing burden on the encoder.

In accordance with various embodiments, approaches are described for transcoding or otherwise processing content, such as media content, from one streaming media format to another. As previously described, a content publisher 302 can provide the media content 308 to the source store 306 or some other storage location provided by the service provider 304. The service provider can then transfer the media content 314 to a cache server 312 (or another server) residing at the network edge location, such as a content delivery network (CDN) point of presence (POP) 310. The transfer may make access to the media more efficient for users proximate to the POP. In an alternative embodiment, the content publisher 302 may provide the textual information and associated media content 314 directly to the POP 310 from a location on the content publisher 302. As previously mentioned, the CDN of the service provider may include a plurality of POPs (such as the POP 310 illustrated) which may be geographically distributed to various locations that are proximate to the end users and devices. Several POPs can use the same internet protocol (IP) address and the routing scheme can be utilized that to find a POP that is the closest to an end user in terms of network hops required to reach it. It should be noted that while the source store 306 is shown as being located outside of the POP 310 in FIG. 3, this is not intended to be a limitation to the various embodiments described herein. In some embodiments, the source store may be located at the same POP 310 and therefore may not need to be transferred. In other embodiments, the source store 306 may be located at another POP (or other resource center) and the transfer of the media content from the source store 306 to the POP 310 may occur in response to receiving the request for media content at the POP 310. Alternatively, the transfer of media content from the source store 306 to the POP 310 may be performed automatically upon placement of the media content 308 into the source store 306.

In accordance with the illustrated embodiment, the POP 310 can include a number of cache servers 312, 322 capable of storing a copy of the media content 314 locally to be made available to the various requesting devices. In addition, the POP 310 may include a transcoding service 316. When a viewer or client device 324, 326, 328 requests the textual information and/or associated media content from the POP 310, the request can be inspected to determine a device type (and other information such as application-type, OS-type, browser-type, etc.) associated with the requesting viewer or client device based on information contained in the request. For example, based on the HTTP header information contained in the request, it may be determined that the device requesting the media file is an Apple® iPhone® running a particular version of the Apple® IOS operating system. In accordance with various embodiments, each device type can be associated with a particular type of encoding format that is suitable to display or render the media file on that device (based on the OS, application, display resolution, settings, etc.). In addition, a profile may be associated with the device type and may contain all of the processing settings and parameters necessary to transcode the media content into the format appropriate for the device. In various embodiments, a variety of information contained in the request can be used to select the type of format for transcoding the media content. For example, request parameters, uniform resource locator (URL) of the request, request metadata, or any other data embedded in the request or received along with the request may be used in this determination.

In accordance with an embodiment, once the type of device requesting the content is identified, the POP 310 can make a determination whether the copy of the media content is in the appropriate format for being provided to the requesting device. If the media content is already in the appropriate format, or is available in the appropriate format, the cache server 312 can simply provide the cached copy to the requesting device. If, on the other hand, the textual information and/or associated media file is not in the correct format to be provided to the requesting device, the cache server 312 can provide the media content to the transcoding service 316 having a transcoding engine 320 to perform dynamic transcoding of the media content 316. In accordance with an embodiment, the transcoding service may transcode the media content based at least in part on the device type and various performance characteristics associated with the device. For example, once the device type is identified, the appropriate settings and parameters for transcoding the media may be selected based on the screen/display capabilities of the requesting device, which version of the operating system the device is running, the processing capacity of the device, available memory on the device and the like.

In accordance with an embodiment, the transcoding service 316 can utilize a graphics processing unit (GPU) configuration to transcode the media content 318 in an optimal performance manner. For example, the transcoding service 316 can use the compute unified device architecture (CUDA) as the computing engine in the GPU to encode the video content into the appropriate format for the requesting device. It should be noted that as previously mentioned, the term "transcoding" is not necessarily limited to changing the format of the media content, but may also include performing such functions as transmuxing, digital watermarking, segmenting, applying access controls, adding metadata, inserting advertisements, translating into various languages, transcribing, changing bit rates, sequencing, changing or adding audio associated with a video, or modifying, customizing, or making compatible various other features of content in any other manner. For example, if a requesting device is not able to handle a certain quality video stream, or a certain data transfer rate, the transcoding server 316 may adjust the quality of the video stream or the data transfer rate to accommodate the device.

In accordance with an embodiment, the transcoding service 316 can transcode the media content 314 in substantially real-time into the correct encoding format when responding to the request by transmitting bits of the media content to the receiving device. For example, the transcoding service 316 can stream the bits that have been encoded into the proper format to the device, while the transcoding engine 320 is transcoding the remaining bits of the media file. In accordance with one embodiment, the POP 310 can utilize an initial burst mode to stream the beginning portion of the media file transcoded at one bit rate and then complete the remaining portion of the media file at a different bit rate. This can help avoid any latency on the part of the requesting device that may be viewing the media content as it is being transcoded and streamed to it. In accordance with an embodiment, if the transcoding service 316 detects that the requesting device has ceased downloading the media, the dynamic transcoding can be terminated in order to save the computing resources of the POP 310. For example, if the user stops viewing the video file, the transcoding server can halt the transcoding process and apply the GPU resource to other transcoding jobs that may be needed.

In some embodiments, the transcoding service 316 may select and perform the transcoding based at least in part on various network conditions, such as bandwidth, jitter, packets lost, and the like. For example, if the network bandwidth is low due to high amounts of traffic/data, the transcoding service 316 may opt to transcode the media content at a lower bit rate or lower resolution in order to deliver the media content more efficiently to the requesting device.

Figure 4:
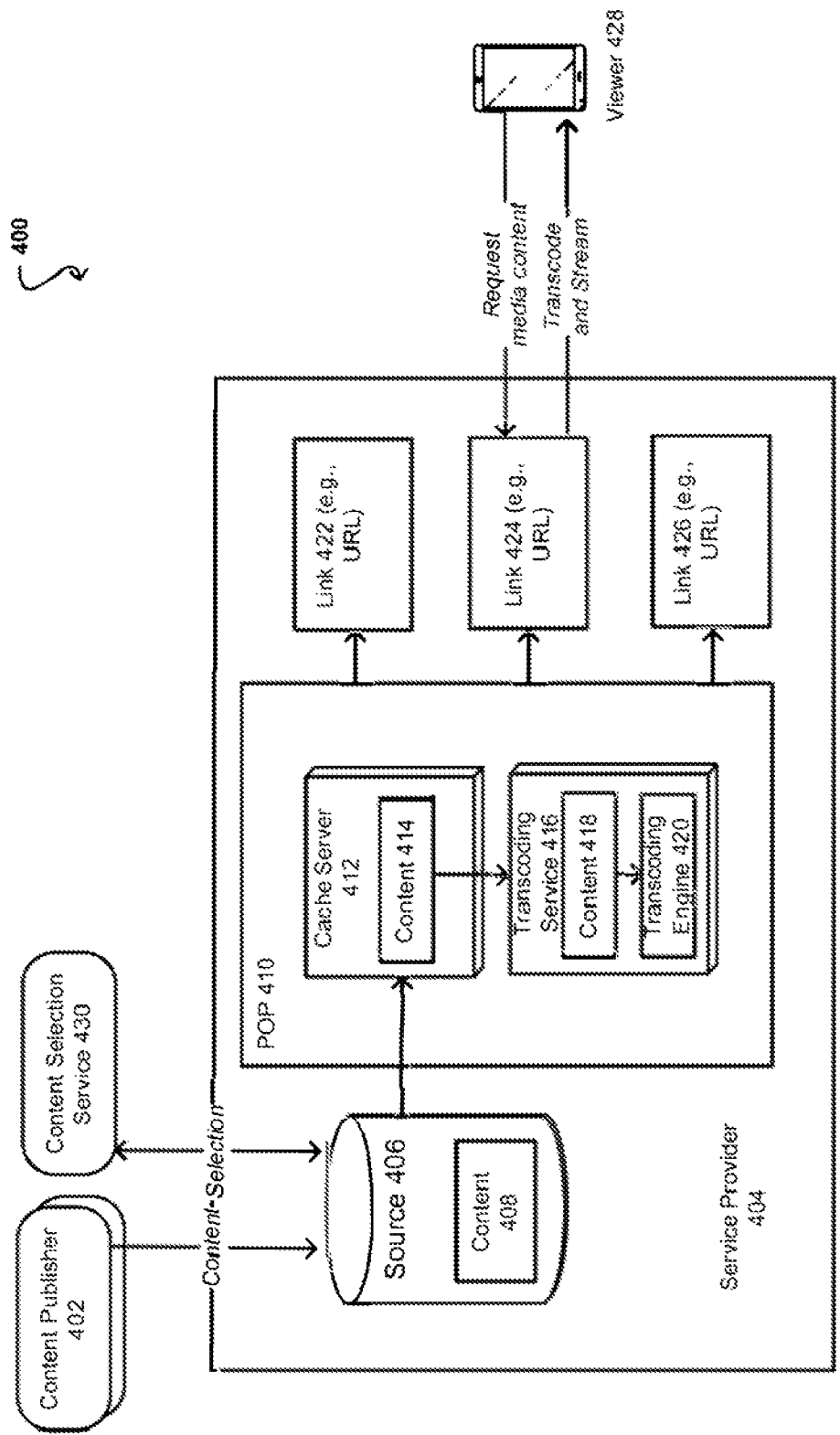
FIG. 4 is another example of an environment wherein multiple instances of content can be dynamically transcoded for a single video stream request in accordance with various embodiments.

FIG. 4 illustrates an example environment 400 wherein media content can be dynamically transcoded. In this example, a content publisher 402 can provide primary and/or supplemental media content 408 to a source store 406 or some other storage location provided by the service provider 404. As described herein, the input video content (or other media transport stream) can be provided by one or more content providers 402. Timing information for the media content can be determined in a number of ways. In one such approach, the start of the video content is determined. The start of the video content can be measured, for example, from when the video content is received by a transcoder (e.g., transcoder service 202). As the video content is received, timing information such as PTS information associated with the video content can be determined. During playback, content can be synchronized by adjusting the decoding of the video content to a common master time base. The master time base may be one of the N decoders' clocks, the data source's clock, or it may be some external clock. Accordingly, in accordance with an embodiment, end-to-end synchronization can occur when encoders save time stamps at capture time, when the time stamps propagate with associated coded data to decoders, and when decoders use those time stamps to schedule presentations.

Returning to FIG. 4, the example embodiment illustrates transcoding the media content for use by one or more client devices, such as a viewer 428 that includes a player or other such client device. The service provider 404 can transfer the content 414 to a cache server 412 (or another server) residing at the network edge location, such as a content delivery network (CDN) point of presence (POP) 410. The transfer may make access to the content efficient for users proximate to the POP. In an alternative embodiment, the content publisher 402 may provide the content 414 directly to the POP 410 from a location on the content publisher 402.

In accordance with the illustrated embodiment, the POP 410 can include a number of cache servers 412 capable of storing a copy of the content 408 locally to be made available to the various requesting devices. In addition, the POP 410 may include a transcoding service 416. When a viewer or client device requests the content 414 from the POP 410, the request can be inspected to determine a device type (and other information such as application-type, OS-type, browser-type, etc.) associated with the requesting viewer based on information contained in the request. In accordance with an embodiment, once the type of device requesting the content is identified, the POP 410 can make a determination whether the copy of the content is available in the appropriate format. If the content is already in the appropriate format, such as on the cache server 412, the cached copy can be provided to the requesting device. If on the other hand, the content is not in the correct format, the transcoding service 416 having a transcoding engine 420 can attempt to perform dynamic transcoding of the content. In accordance with an embodiment, the transcoding service 416 can transcode the content 408 in substantially real-time in accordance with various embodiments described herein and provide access to the content using one or more links (e.g., URLs 422, 424, and 426).

In accordance with various embodiments, the transcoding engine 420 can dynamically transcode the content 408. This can include primary content or supplemental content, as may have been specified or provided by a content selection service 430, such as an ad decision service. A public endpoint (e.g., a URL) for a nonexistent output can be provided to access the transcoded content 418. When a player requests a manifest, all of the processing required to convert the content can be performed at this time. Thereafter, in accordance with various embodiments, the service provider 404 can store the converted content to one of cache servers 412 or other server or storage component. The stored content can be made available to the various requesting devices in subsequent requests for the content. For example, in the situation where a subsequent request is received, the type of device requesting the content is identified. The POP 410 can make a determination whether a copy of the previously converted content is in the appropriate format for being provided to the requesting device. If the previously converted content is already in the appropriate format, the cache server can simply provide the cached copy to the requesting device.

Figure 5:
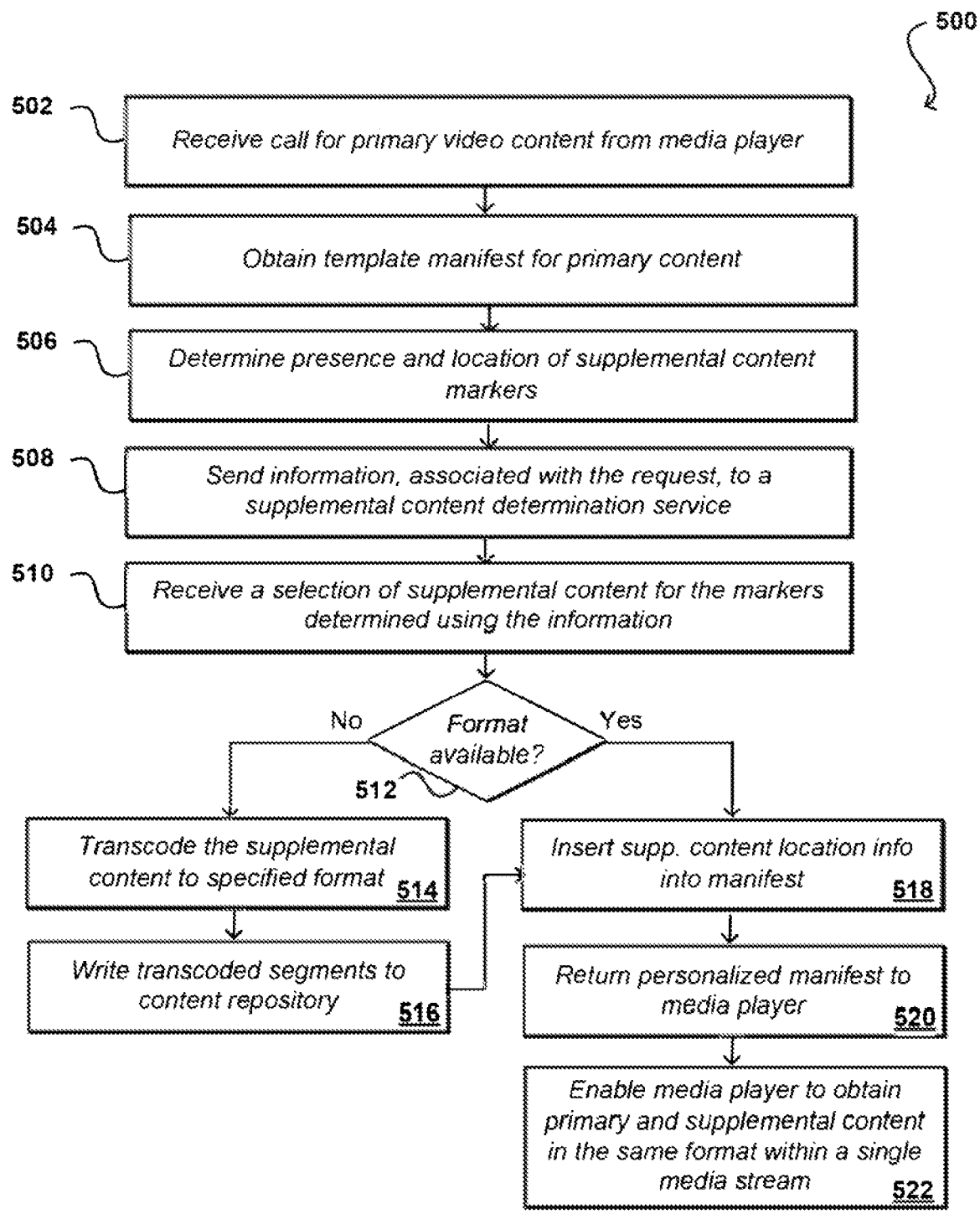
FIG. 5 illustrates an example process for dynamically transcoding supplemental content for a video stream that can be utilized in accordance with various embodiments.

FIG. 5 illustrates an example process 500 for transcoding media content that can be utilized in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In this example, a call or request for video content is received 502 from a media player or other such device or application. As discussed herein, the request can relate to identified content, and can also be a request for a manifest for the identified primary media content. As mentioned, the request can be an initial request, or can be a subsequent request received during streaming of the primary content to obtain updated manifest information, among other such options. The request can be received to an appropriate component or interface of a content provider system or service, for example, which can direct the request to a manifest manipulation service or other such component. The manifest manipulation service can reach out to a content origin, or other such source that may be part of the content provider environment, to obtain 504 a template manifest for the primary content. The template content can include any appropriate information relevant to the primary content as discussed herein, as may include information about timing, available formats, and supplemental content markers, among other such options. In some embodiments, sources such as the template manifest can be analyzed to determine 506 the presence and location of supplemental content markers for the primary video content. For a live broadcast, this may include markers for news, advertising, and other content that is to be played during breaks in the primary content over an upcoming period of time, such as a rolling five minute interval. The location and presence of the markers can come from various other sources or locations as well, such as from an associated file or from the discovery service, among other such options. The types or availability of these markers can vary by the type of video content as well, such as for video on demand (VOD) or live video streams.

In this example, the manifest manipulation service can attempt to obtain personalized content for the various supplemental content markers to be presented by the media player. As mentioned, while there can be various devices receiving the primary content in the same format, in at least some embodiments it is desirable to obtain at least some amount of personalized content for the specific device or viewer. While some supplemental content, such as news breaks or emergency messages, may be the same for all viewers, or at least a number of viewers, there may still be at least some amount of supplemental content, such as advertising, that may be able to be selected for the various devices based at least in part upon information specific to those devices. This can include, for example, information submitted with the request, as may include demographic or other information. This can also include information from other sources as well, such as historical view or interest information for a user, among other such options, that may be available from any of a number of different sources or from the content provider environment itself. In this example, the information is sent 508 to a supplemental content determination service, although other determination systems or services can be utilized as well within the scope of the various embodiments.

In response, the manifest manipulation service can receive 510 a selection of one or more instances of supplemental content for each content marker (or at least a subset of the markers) in the current manifest. As mentioned, in some embodiments the service will return a set of options for each marker from which the content provider may select based upon various criteria, such as length, available formats, and the like. The information returned can include any appropriate identifying information, such as may include a hyperlink, storage location, content identifier, or other such information. Once an instance of supplemental content is identified, the manifest manipulation service can call a transcoding service, or other such media providing service, to attempt to determine 512 whether the supplemental content is available in the format with which the media player is playing the primary content. This can include not only a specific file format or type, but also information about the resolution, bit rate, frames per second, or other such aspects. If it is determined 512 that the supplemental content is not available in the appropriate format, then the transcoding service can transcode 514 the identified supplemental content into the appropriate format. As mentioned, this may include taking an original, high quality copy of the supplemental content as provided by the content provider and performing a transcode into the appropriate format. Once generated, the transcoded segments can then be written 516 to an appropriate content repository.

Once the supplemental video segments are available in the correct format, or if the segments are already available from an appropriate content repository, information for the location of the supplemental content can be inserted 518 into the manifest. As mentioned, this can include information such as URL information identifying a location from which the media player can obtain the supplemental media content in the same, or substantially similar, format as that of the primary content in the stream with which the supplemental content is being presented. In some embodiments, if the format is not available in time then an alternative supplemental content instance can be provided, or no content provided for that marker, among other such options discussed herein. The insertion of the information can then result in a personalized manifest that is unique, or at least uniquely generated, for the specific media player, although other approaches can be used as well that do not attempt personalization for each individual player, etc. The personalized manifest can then be returned 520 to the media player. As mentioned, this can take any appropriate format, such as an XML file that includes entries for the various markers and instances of content. The media player, upon receiving the manifest, can then be enabled 522 to use the location or identifier information in the manifest to obtain the segments for the primary and supplemental content on the stream. Taking such an approach, the primary and supplemental content can be received in the same format and on the same video stream, which can result in a much more consistent and pleasant viewing experience that is obtained using conventional approaches discussed herein.

Figure 6:
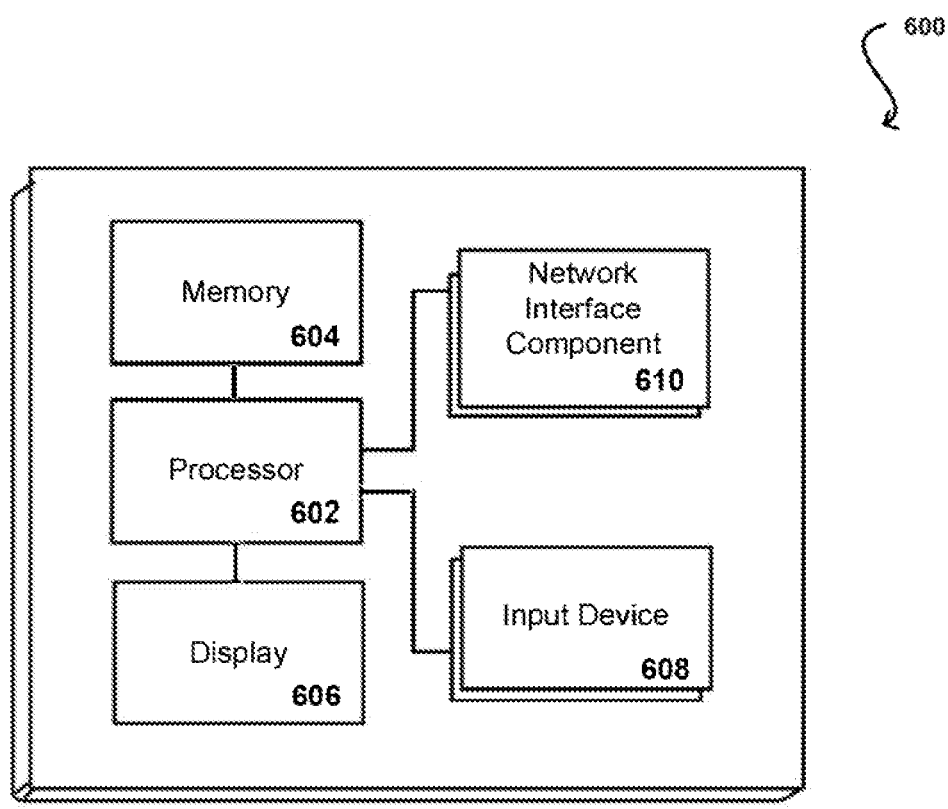
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 610 for communicating over various networks, such as a Wi-Fi, Bluetooth, RF, wired, or wireless communication systems. The device in many embodiments can communicate with a network, such as the Internet, and may be able to communicate with other such devices.

Figure 7:
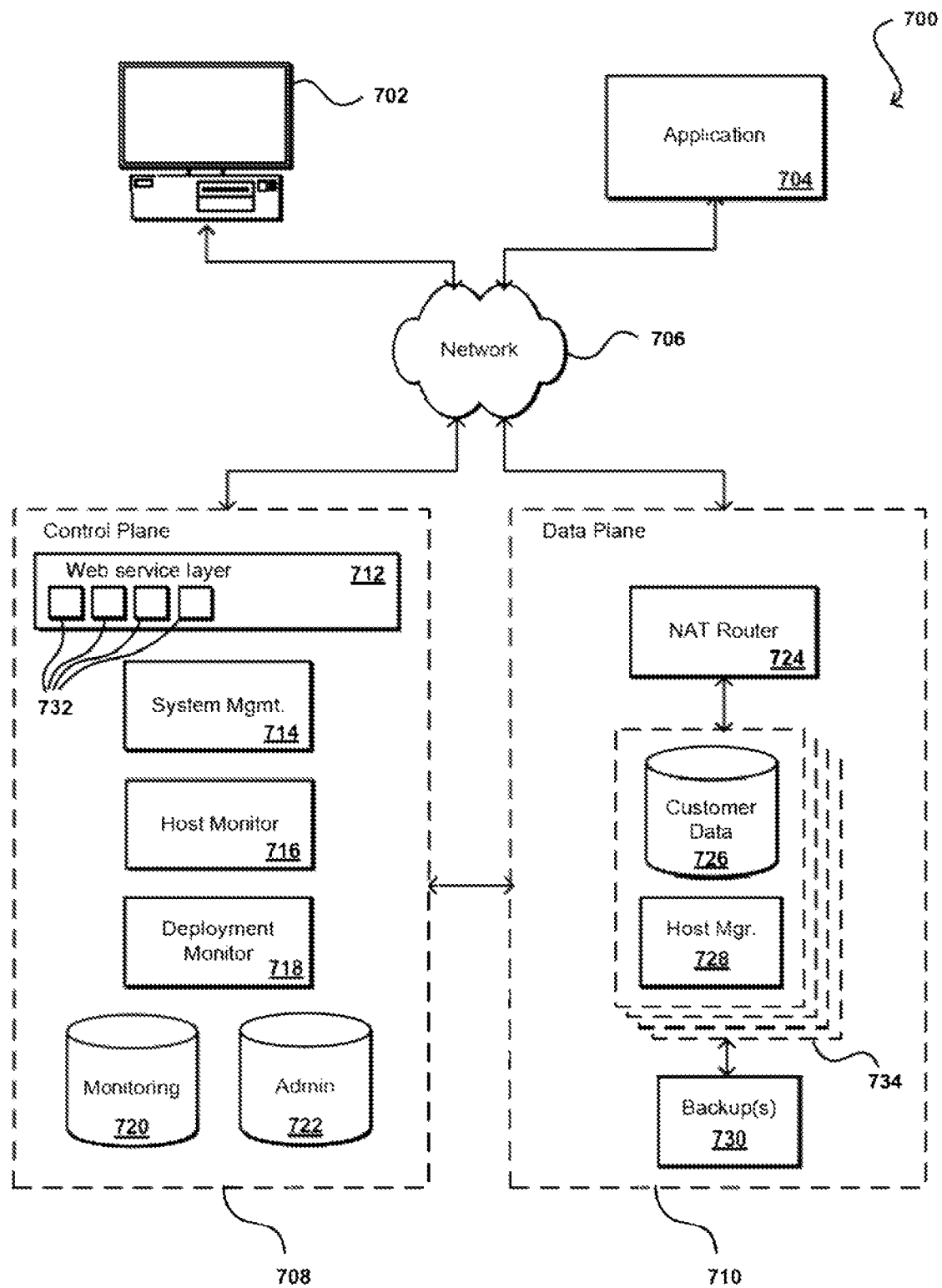
FIG. 7 illustrates an environment in which various embodiments can be implemented.

FIG. 7 illustrates an example of an electronic resource environment 700 that can be used in accordance with various embodiments. In this example, a computing device 702 for an end user is shown to be able to make calls through at least one network 706 (e.g., the Internet, a cellular network, a wireless network, a local area network (LAN), etc.) into a control plane 708 to perform a task such as to provision a data repository or launch a virtual machine in a data plane 710. The user or an application 704, for example, can access the repository and/or virtual machine directly through an interface of the data plane 710. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 708 in this example is essentially a virtual layer of hardware and software components that handles control and management actions, such as provisioning, instantiating, launching, scaling, replication, etc. The control plane in this embodiment includes a Web services layer 712, or tier, which can include at least one Web server, for example, along with computer-executable software, application servers, or other such components. The Web services layer also can include a set of APIs 732 (or other such interfaces) for receiving Web services calls or requests from across the at least one network 706. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 714, or other such system or service.

The control plane 708 in this embodiment includes at least one host monitoring component 716. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 720. It should be understood that the monitoring data store can be a separate data store, or can be a portion of another data store such as a distinct set of tables in an Admin data store 722, or other appropriate repository. A host monitoring component 716 can access the information in the monitoring data store to determine active VMs, resource instances, or other such resources or components 734 in the data plane 710. A host monitoring component also can perform other tasks, such as collecting log and/or event information from multiple components of the control plane and/or data plane, such as the Web service layer and various host managers 728. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 734 (e.g., data instance or virtual machine) in the data plane can include at least one data store 726 and a host manager component 728 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 716 in the control plane 708 can communicate periodically with each host manager 728 for monitored instances 734, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 718 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

As discussed, once an instance is provisioned and a user is provided with a DNS address or other address or location, the user can send requests "directly" to the data plane 710 through the network using a Java Database Connectivity (JDBC) or other such client to directly interact with that instance 734. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 702 or application 704, for example, can be directed to a network address translation (NAT) router 724, or other appropriate component, which can direct the request to the actual instance 734 or host corresponding to the DNS of the request. As discussed, such an approach allows for instances to be dynamically moved, updated, replicated, etc., without requiring the user or application to change the DNS or other address used to access the instance. As discussed, each instance 734 can include a host manager 728 and a data store 726, for example, and can have at least one backup instance or copy in persistent storage 730. Using such an approach, once the instance has been configured through the control plane, a user, application, service, or component can interact with the instance directly through requests to the data plane, without having to access the control plane 708. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 708 can be offered as at least one service by a provider that may or may not be related to a provider of the data plane 710, but may simply be a third-party service that can be used to provision and manage data instances in the data plane, and can also monitor and ensure availability of those instances in a separate data plane 710.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request for primary media content;
   determining that supplemental content that is to be included with the primary media content is unavailable for inclusion with the primary media content, based in part on the supplemental content being of a different format than the primary media content;
   inserting alternative content or an underlying portion of the primary media content to be presented with the primary media content;
   causing, during presentation of the primary media content, the supplemental content to be transcoded into a format of the primary media content; and
   enabling a manifest to comprise the supplemental content integrated into a unified stream for a future request.

2. The computer-implemented method of claim 1, further comprising:
   determining that the supplemental content is unavailable in the format of the primary video content for a time indicated by a marker; and
   providing information for the alternative content or the underlying portion of the primary media content to be available for the marker.

3. The computer-implemented method of claim 1, further comprising:
   providing the supplemental content to a media player in response to the future request to enable the supplemental content to play with the primary media content.

4. The computer-implemented method of claim 1, further comprising:
   maintaining at least a master copy of the supplemental content as received from at least one content provider;
   using the master copy to transcode the supplemental content into a plurality of formats corresponding to received requests; and
   storing the supplemental content in the plurality of formats, once transcoded, for use in the future requests.

5. The computer-implemented method of claim 1, further comprising:
   determining whether the supplemental content is available in a second format before causing the supplemental content to be transcoded into the format of the primary video content, the supplemental content capable of being provided to the media player in the second format for a marker in the manifest.

6. The computer-implemented method of claim 1, further comprising:
   enabling the alternative content or the underlying portion of the primary media content to be integrated into an initial manifest as an initial unified stream;
   presenting the primary media content with the alternative content or the underlying portion of the primary media content according to the initial manifest; and
   upon the future request, providing the manifest as an update to the initial manifest.

7. A system, comprising:
   at least one processor; and
   memory including instructions that, when executed by the at least one processor, cause the system to:
   receive a request for primary media content;
   determine that supplemental content to be included with the primary media content is unavailable for inclusion with the primary media content, based in part on the supplemental content being of a different format than the primary media content;
   insert alternative content or an underlying portion of the primary media content to be presented with the primary media content; and
   cause, during presentation of the primary media content with the alternate content, the supplemental content to be transcoded into a format of the primary media content for a future request.

8. The system of claim 7, wherein the memory including the instructions that, when executed by the at least one processor, further cause the system to:
   enable a manifest to comprise the supplemental content integrated into a unified stream for the future request.

9. The system of claim 7, wherein the memory including the instructions that, when executed by the at least one processor, further cause the system to:
   determine a second instance of the supplemental content is to be presented at a second designated time within the presentation of the primary media content;
   determine that the second instance of supplemental content is available in the format of the primary media content; and
   provide information for a second location of the second instance of supplemental content.

10. The system of claim 7, wherein the memory including the instructions that, when executed by the at least one processor, further cause the system to:
    determine that the supplemental content is unavailable in the format of the primary video content for a time indicated by a marker; and
    provide information for the alternative content or the underlying portion of the primary media content to be available for the marker.

11. The system of claim 7, wherein the memory including the instructions that, when executed by the at least one processor, further cause the system to:
    provide the supplemental content to a media player in response to the future request to enable the supplemental content to play with the primary media content.

12. The system of claim 7, wherein the memory including the instructions that, when executed by the at least one processor, further cause the system to:

send, to a content determination service, information for the future request; and receive, from the content determination service, a selection of one or more instances of the supplemental content, the selection determined based at least in part upon information for the future request.

13. The system of claim 7, wherein the information in the future request includes demographics information for a user of a media player on which the primary media content is being presented, and wherein the supplemental content is able to be personalized for the user.

14. The system of claim 7, wherein the memory including the instructions that, when executed by the at least one processor, further cause the system to:

maintain at least a master copy of the supplemental content as received from at least one content provider;

use the master copy to transcode the supplemental content into a plurality of formats corresponding to received requests; and store the supplemental content in the plurality of formats, once transcoded, for use in the future requests.

15. The system of claim 7, wherein the memory including the instructions that, when executed by the at least one processor, further cause the system to:

determine whether the supplemental content is available in a second format before causing the supplemental content to be transcoded into the format of the primary video content, the supplemental content capable of being provided to the media player in the second format for a marker in the manifest.

16. The system of claim 7, wherein the memory including the instructions that, when executed by the at least one processor, further cause the system to:

enable the alternative content or the underlying portion of the primary media content to be integrated into an initial manifest as an initial unified stream;

present the primary media content with the alternative content or the underlying portion of the primary media content according to the initial manifest; and upon the future request, provide the manifest as an update to the initial manifest.

17. A non-transitory computer-readable medium comprising instructions that, when executed by a processor of a computer system, cause the computer system to:

receive a request for primary media content;

determine that supplemental content to be included with the primary media content is unavailable for inclusion with the primary media content, based in part on the supplemental content being of a different format than the primary media content;

insert alternative content or an underlying portion of the primary media content to be presented with the primary media content; and cause, during presentation of the primary media content with the alternate content, the supplemental content to be transcoded into a format of the primary media content for a future request.

18. The non-transitory computer-readable medium of claim 17, wherein the instructions that, when executed by the processor of the computer system, further cause the computer system to:

enable a manifest to comprise the supplemental content integrated into a unified stream for the future request.

19. The non-transitory computer-readable medium of claim 17, wherein the instructions that, when executed by the processor of the computer system, further cause the computer system to:

determine a second instance of the supplemental content is to be presented at a second designated time within the presentation of the primary media content;

determine that the second instance of supplemental content is available in the format of the primary media content; and provide information for a second location of the second instance of supplemental content.

20. The non-transitory computer-readable medium of claim 17, wherein the instructions that, when executed by the processor of the computer system, further cause the computer system to:

determine that the supplemental content is unavailable in the format of the primary video content for a time indicated by a marker; and provide information for the alternative content or the underlying portion of the primary media content to be available for the marker.

\* \* \* \* \*